United States Patent [19]
Gontsch

[11] Patent Number: 5,809,092
[45] Date of Patent: Sep. 15, 1998

[54] METHOD AND CIRCUIT ARRANGEMENT FOR SYNCHRONIZING FRAMES IN MULTICELLULAR TELECOMMUNICATIONS SYSTEMS

[75] Inventor: Heinz Gontsch, Niefern, Germany

[73] Assignee: Alcatel N.V., Rijswijk, Netherlands

[21] Appl. No.: 661,373

[22] Filed: Jun. 11, 1996

[30] Foreign Application Priority Data

Jun. 28, 1995 [DE] Germany ............... 195 23 489.8

[51] Int. Cl.$^6$ ...................................... H04L 7/00
[52] U.S. Cl. ................. 375/356; 375/354; 370/509
[58] Field of Search .................. 375/354, 356, 375/358; 370/252, 508, 509, 516, 519

[56] References Cited

U.S. PATENT DOCUMENTS

| | | | |
|---|---|---|---|
| 5,268,933 | 12/1993 | Averbuch | 375/356 |
| 5,363,376 | 11/1994 | Chuang et al. | 375/356 X |
| 5,469,467 | 11/1995 | Vella-Coleiro | 375/358 |
| 5,613,195 | 3/1997 | Ooi | 375/356 X |

FOREIGN PATENT DOCUMENTS

| | | |
|---|---|---|
| 2827615 | 1/1980 | Germany . |
| 3616556 | 11/1987 | Germany . |
| 4243442 | 3/1994 | Germany . |
| 4243441 | 4/1994 | Germany . |
| 4407794 | 9/1995 | Germany . |

OTHER PUBLICATIONS

"Eine neue Generation von Telekommunikationsanlagen", G. Siegmund, ntz, vol. 47, No. 3 (1994). pp. 158–164.

*Primary Examiner*—Young T. Tse
*Attorney, Agent, or Firm*—Ware, Fressola, Van Der Sluys & Adolphson LLP

[57] ABSTRACT

Telecommunications systems are often built by interconnecting similar subsystems, to enable the adaptation of the systems to different numbers of subscribers. Such a structure must fulfill the requirement that a subscriber with a cordless terminal can move freely within the area served by the telecommunications system without interrupting the call, regardless of which subsystem serves his radio cell at the moment. An uninterrupted hand-off requires the digital information to be frame synchronized. By measuring the time difference ($\Delta t2$) between the frame synchronization pulse (FR1) of a subsystem and the frame synchronization pulse (RFR2) which is recovered by an adjacent subsystem, a delay time interval can be calculated, taking the signal propagation time ($\Delta T$) between the subsystems into account, so that any frame offset is equalized. The method can be used for systems which operate according to the DECT standard.

6 Claims, 4 Drawing Sheets

METHOD AND CIRCUIT ARRANGEMENT FOR SYNCHRONIZING FRAMES IN MULTICELLULAR TELECOMMUNICATIONS SYSTEMS

TECHNICAL FIELD

The invention concerns a method and a circuit arrangement for synchronizing frames during the digital transmission of information in a telecommunications network, which is composed of several telecommunications systems that are often remote from each other.

BACKGROUND OF THE INVENTION

Remote systems in such networks are generally provided with the necessary clock signals by a master system, so that the individual systems within a telecommunications network can operate in clock-controlled synchronism. This creates a clock offset caused by the signal propagation times along the transmission lines, and by the different quadripole transmissions, which has no effect on the individual systems if each system contains wired terminals. But other telecommunications systems which comprise smaller coupled subsystems are known, see G. Siegmund: "A new generation of telecommunications systems", *Ntz*, Vol. 47, No. 3 (1994), pages 158 to 164. Depending on the need, each subsystem can be equipped with different interface circuits, for example with interface circuits for wired terminals as well as with an interface circuit for connecting base stations to form a multicellular infrastructure in accordance with the Digital European Cordless Telephone (DECT) standard, so that cordless telephones can access a subsystem that is equipped in this manner. Larger network configurations are formed by coupling several subsystems. Each subsystem contains a predetermined number of units, so that the number of possible base station connections in each subsystem is limited. This type of telecommunications system structure must also fulfill the requirement that a subscriber with a cordless terminal can move freely within the area served by the telecommunications system without interrupting his call, and that is regardless of which subsystem serves his radio cell at the moment.

DISCLOSURE OF INVENTION

The result of this requirement is the task of achieving synchronization of all subsystem frames, to ensure an uninterrupted hand-off (cell change) when passing from a first to a second subsystem, regardless of whether the subsystems are directly connected to each other, or are arranged as remote subsystems through dedicated connections.

According to a first aspect of the present invention, a method of synchronizing frames during digital transmission of information from a first subsystem to a second subsystem in a telecommunications system consisting of two or more interconnected subsystems which may be remote from each other, is characterized by the following steps:

in the first subsystem, a second time difference between the frame synchronization pulse of the first subsystem and the frame synchronization pulse received from the second subsystem is determined and transmitted to the second subsystem; and in the second subsystem, a first time difference between the frame synchronization pulse of the second subsystem and the frame synchronization pulse received from the first subsystem is determined, the signal propagation time between the first subsystem and the second subsystem is determined from the sum of the first time difference and the second time difference, and the frame synchronization pulse of the second subsystem is subsequently delayed by a time interval equal to the difference between the first time difference and the signal propagation time.

According to a second aspect of the present invention, a circuit arrangement for carrying out the above-described method is characterized in that, to determine the time difference between the frame synchronization pulse of the first subsystem and the frame synchronization pulse received from the second subsystem, the received clock is applied to the input of a frame aligner which organizes the association between digital information and clocks, that the output of the frame aligner at which the received frame synchronization pulse is provided is connected to a first input of a comparator, and that the line carrying the frame synchronization pulse of the first subsystem is connected to a second input of the comparator, whose output is coupled to a microcomputer having its output connected to a delay circuit.

Thus, the method according to the present invention, which can be realized with a simple circuit arrangement, equalizes both the frame offset in different subsystems and the signal propagation times from one subsystem to an adjacent subsystem. With this method it is also possible to undertake multiframe synchronization, as required for the transmission of coded data.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 6:
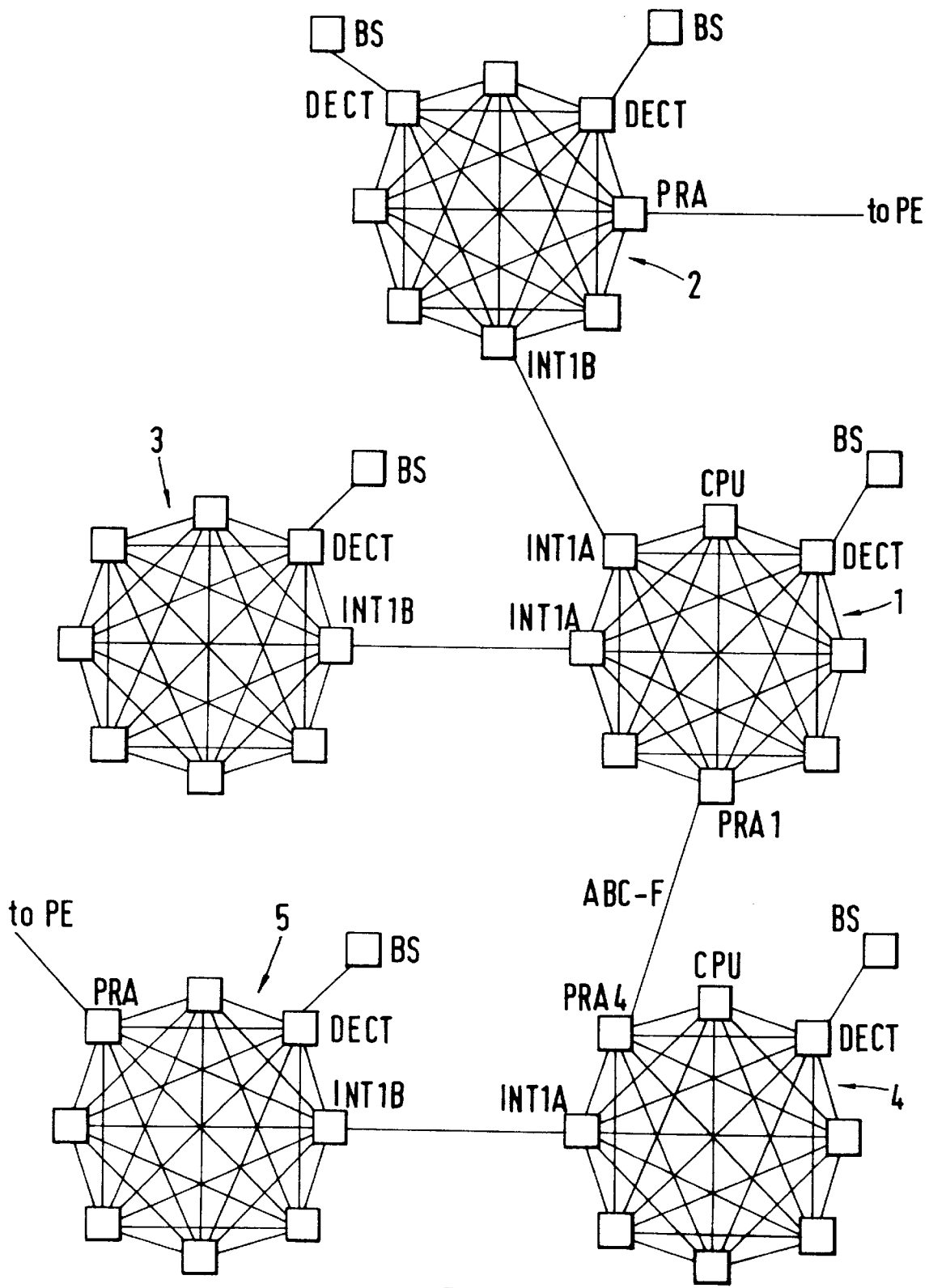
FIG. 6 is a circuit diagram of a telecommunications system comprising five subsystems.

To provide telecommunications systems, briefly called TK systems, for a different number of subscriber connections, different construction stages of the TK systems are built up in modular form from similarly constructed subsystems, e.g. see FIG. 6.

Figure 1:
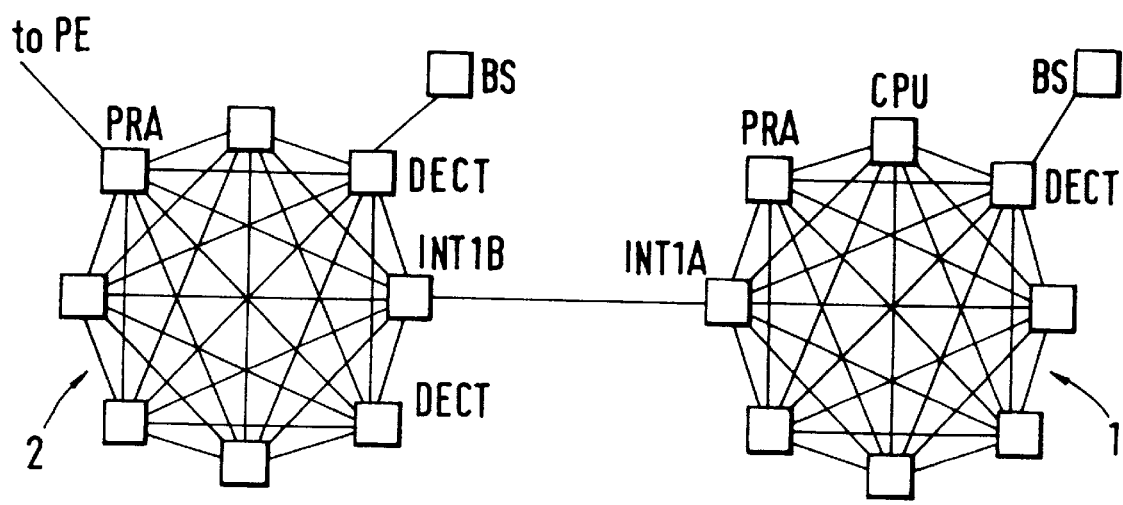
FIG. 1 is a circuit diagram for interconnecting two subsystems.

FIG. 1 illustrates a TK system comprising a first subsystem 1 and a second subsystem 2. Each subsystem contains a predetermined number of peripheral units, which are interconnected in the form of a complete mesh, and which contain different interface circuits. The peripheral units needed to explain the operation of the invention are identified in greater detail. The first subsystem 1 contains an interface circuit DECT, in which a base station BS is provided for access by cordless terminals; there is furthermore a primary multiplex connection PRA for access to the public network, a first interface circuit INT1A for interconnection of the subsystems, and a central control unit CPU, which is provided only in the first subsystem 1, the so-called master system, and supports the control processes of both the first subsystem 1 and the second subsystem 2. The second subsystem 2 contains an interface circuit DECT with a base station BS, a primary multiplex connection PRA for access to the public network PE, and a second interface circuit INT1B.

Figure 2:
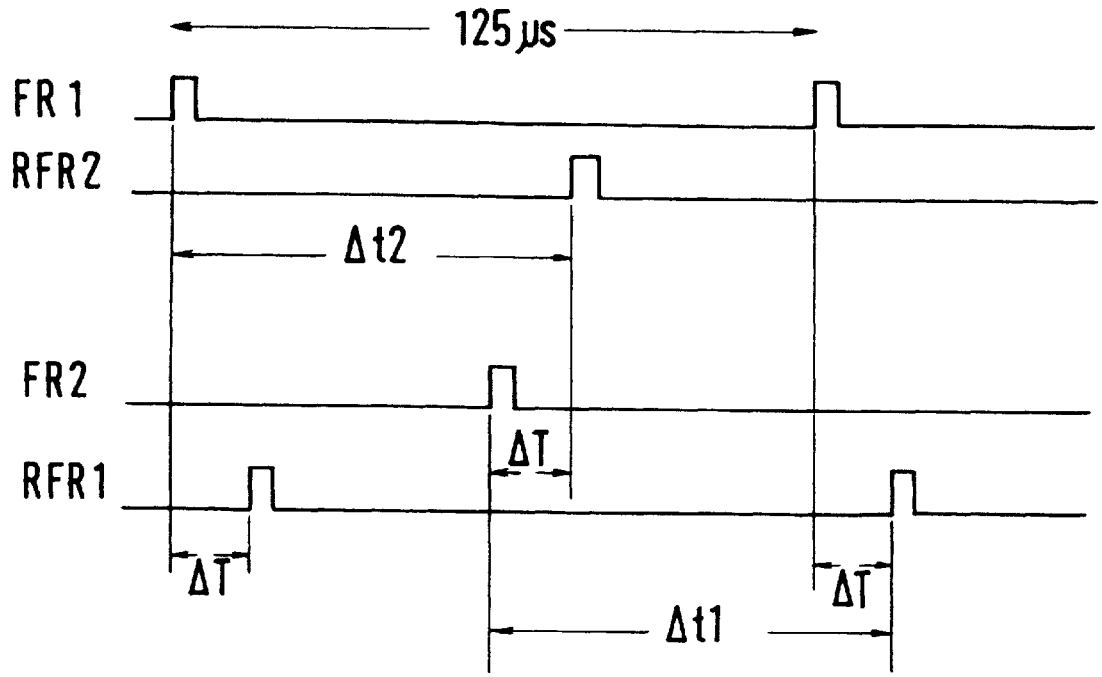
FIG. 2 is a first pulse diagram with frame synchronization pulses of two subsystems.
Figure 3:
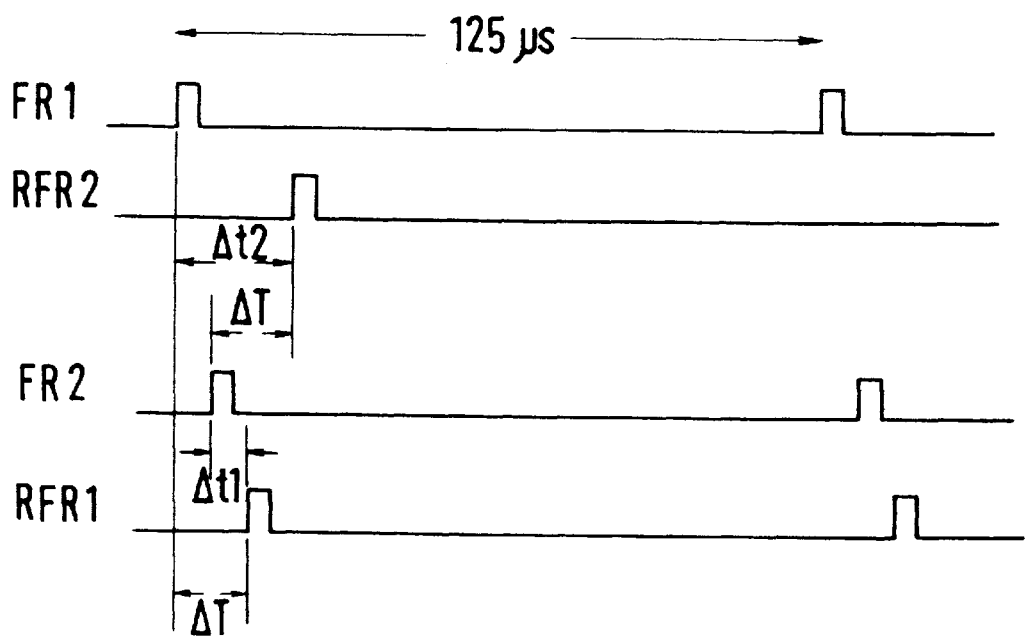
FIG. 3 is a second pulse diagram with frame synchronization pulses of two subsystems.

The clock of the first subsystem 1 is supplied by the clock generator of the central control unit CPU, and the clock of the second subsystem 2 is supplied by the public network PE. Although there is synchronism between the clocks themselves, FIGS. 2 and 3 show that the first frame synchronization pulse FR1 of the first subsystem 1 and the second frame synchronization pulse FR2 of the second subsystem 2 can have any time position with respect to each other. Due to the signal propagation time, the magnitude of which depends on the length of the connection line between the first interface circuit INT1A and the second interface circuit INT1B, a delay time $\Delta T$ takes place between the first frame synchronization pulse FR1 and the first frame synchronization pulse RFR1, which is recovered by the second subsystem 2. The same delay time $\Delta T$ takes place between the second frame synchronization pulse FR2 and the second frame synchronization pulse RFR2, which is recovered by the first subsystem 1. In the first subsystem 1, the first time difference $\Delta t2$ is measured between the first frame synchronization pulse FR1 and the recovered second frame synchronization pulse RFR2, by means of a circuit arrangement illustrated in FIG. 4, which is built into the first interface circuit INT1A. In the same way, the second time different $\Delta t1$ is measured between the second frame synchronization pulse FR2 and the recovered first frame synchronization pulse RFR1, by means of the circuit arrangement illustrated in FIG. 4, which is also built into the second interface circuit INT1B. The first time difference $\Delta t2$ and the second time difference $\Delta t1$ are measured by a microcomputer 6, see FIG. 4, in steps of 0 . . . 255 of a 2-MHz clock. Under the control of the central control unit CPU, the first time difference $\Delta t2$ is transmitted to the second interface circuit INT1B, so that the first time difference $\Delta t1$ and the second time difference $\Delta t2$ are available there for further processing. In the event that the frame synchronization pulses FR1, FR2 have an 8-kHz clock, the following applies to FIG. 2:

$$\Delta t2 - \Delta T + \Delta t1 - \Delta T = 125 \ \mu s \ \Delta t1 + \Delta t2 = 2\Delta T + 125 \ \mu s \quad (1)$$

FIG. 3 illustrates the pulse diagram in the event $\Delta t1 < \Delta T$. In that case the result is:

$$\Delta t2 = \Delta T - \Delta t1 + \Delta T \ \Delta t1 + \Delta t2 = 2\Delta T \quad (2)$$

Figure 5:
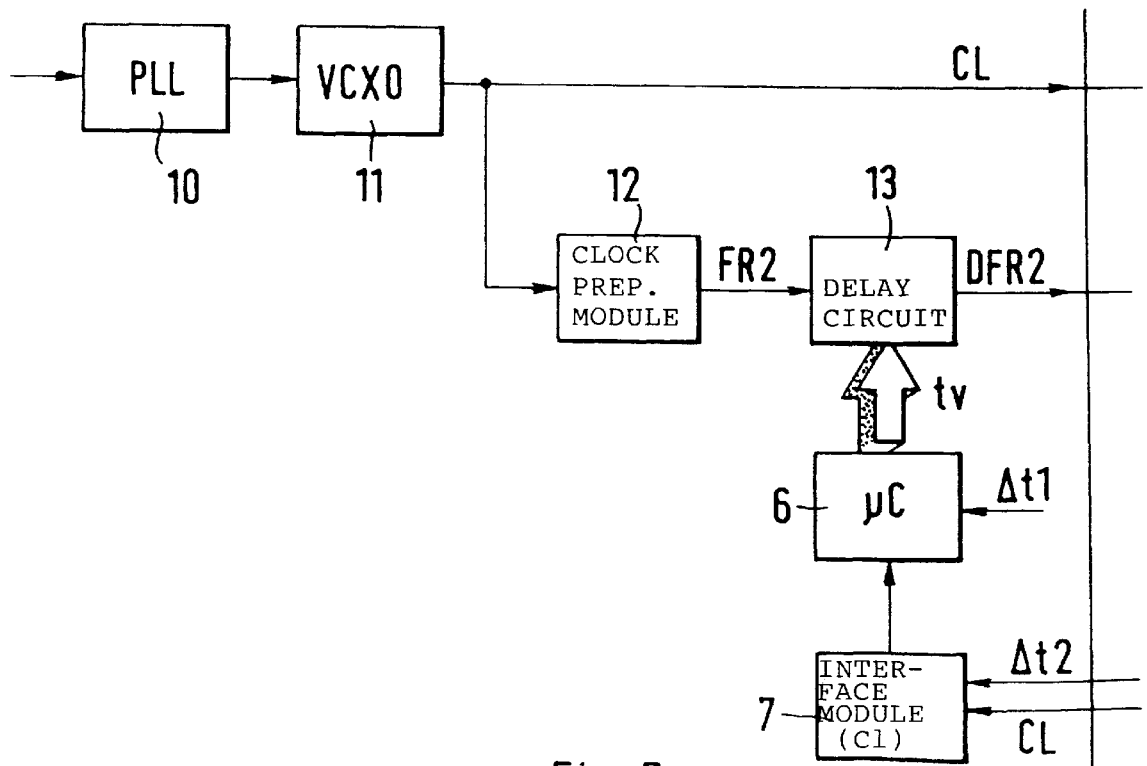
FIG. 5 is a diagram of a circuit arrangement for delaying a frame synchronization pulse.

In this way the microcomputer 6, see FIG. 5, can determine the delay time $\Delta T$ according to equations (1) and (2) from the first time difference $\Delta t2$ and the second time difference $\Delta t1$. To achieve frame synchronization between the first frame synchronization pulse FR1 and the second frame synchronization pulse FR2, the second frame synchronization pulse FR2 is delayed by the time interval tv=$\Delta t1 - \Delta T$. The delay is caused by the circuit arrangement illustrated in FIG. 5, which is assigned to the second interface circuit INT1B. The method of the invention advantageously achieves that the delay time interval tv takes the signal propagation time $\Delta T$ between the subsystems into account, so that the frame synchronization can be established, regardless of the line length between the individual subsystems.

Figure 4:
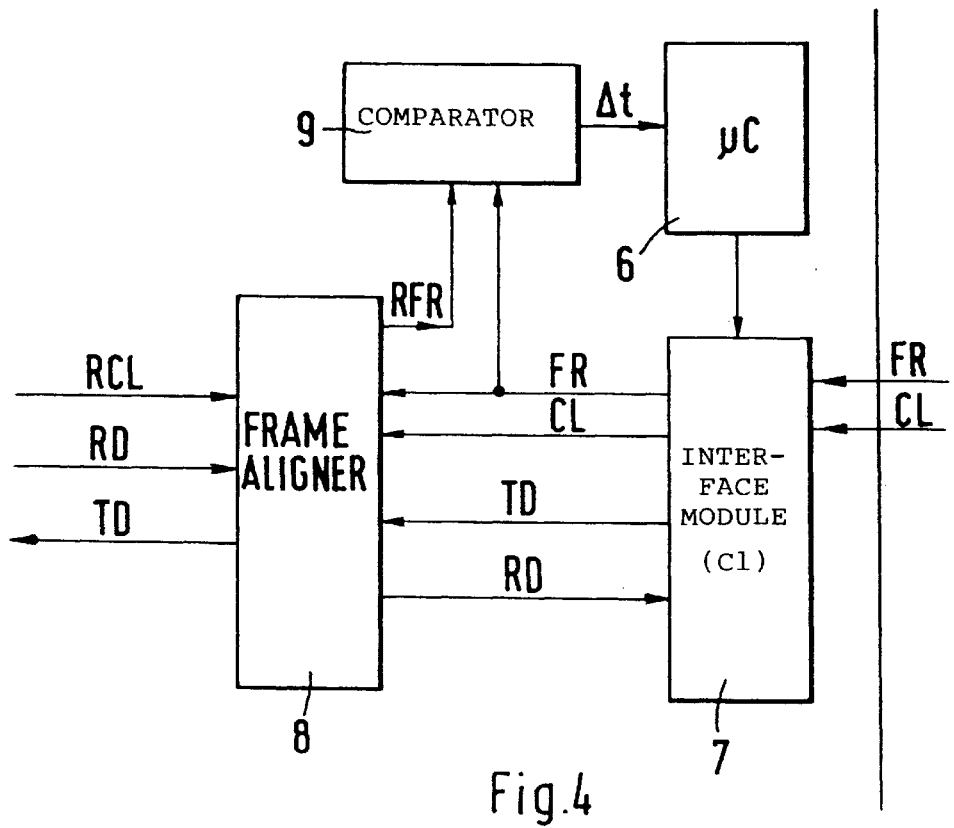
FIG. 4 is a diagram of a circuit arrangement for comparing two frame synchronization pulses.

FIG. 4 illustrates a section of the circuit arrangement of the first and the second interface circuit INT1A, INT1B.

This circuit arrangement comprises a microcomputer 6, a special customer-specific C1 interface module 7, a frame aligner 8 and a comparator 9. Each peripheral interface circuit of a subsystem contains a C1 interface module 7 which manages the access to the interface connections of a subsystem, and which is controlled by the microcomputer 6. The frame aligner 8 provides assignment of their own clock pulses CL, the recovered clock pulses RCL, their own frame synchronization pulses FR, and the recovered frame synchronization pulses RFR, to the received data RD and the transmitted data TD. The comparator 9 measures the time difference $\Delta t$ between the frame synchronization pulse FR and the recovered frame synchronization pulse RFR, namely the first time difference $\Delta t2$ in the first subsystem 1 by means of the first interface circuit INT1A, and the second time difference $\Delta t1$ in the second subsystem 2 by means of the second interface circuit INT1B. The comparator 9 comprises an 8-bit counter, which is started for example by the frame synchronization pulse FR of the first subsystem 1. The 8-bit counter counts until a recovered frame synchronization pulse RFR is received from the second subsystem 2, for example. This recovered frame synchronization pulse RFR stops the counter, the counter reading is written to a memory and read by the microcomputer 6. Under the control of the central control CPU of the first subsystem 1, the first time difference $\Delta t2$ is transmitted to the second interface circuit INT1B of the second subsystem 2.

The circuit arrangement for delaying the frame synchronization pulses, illustrated in FIG. 5, is only present in the first subsystems, which are controlled by the master system 1. The circuit arrangement comprises the previously cited microcomputer 6 and the C1 interface module 7, as well as a phase locked loop 10, a voltage-controlled oscillator 11, a clock preparation module 12 and a delay circuit 13. In conjunction with the phase locked loop 10, the voltage-controlled oscillator 11 constitutes a clock generator which produces the basic clock CL by means of the clock preparation module 12, from which the second frame synchronization pulse FR2 of the second subsystem 2 is derived. In addition, the first time difference $\Delta t2$ of the first subsystem 1, and the second time difference $\Delta t1$ of the second subsystem 2 are available, from which the delay time interval tv for delaying the second frame synchronization pulse FR2 is calculated by the microcomputer 6 in accordance with equations (1) and (2). The digital value of the delay time interval tv is stored in a register of the delay circuit 13, which is followed by a counter. The second frame synchronization pulse FR2 initializes the delay circuit 13, the counter starts and supplies the delayed second frame synchronization pulse DFR2 for further processing, after the delay time interval tv has passed.

FIG. 6 illustrates the structure of a larger TK system, which comprises several subsystems and must fulfill the prerequisites for the uninterrupted hand-off of cordless terminals. The first subsystem 1 with a central control unit CPU forms a so-called cluster configuration with the second subsystem 2 and a third subsystem 3. A comparable structure is formed by a fourth subsystem 4 with a central control unit CPU and a fifth subsystem 5. Such cluster configurations can be interconnected as remote system parts into a total system by means of dedicated connections ABC–F. A subscriber cannot determine to which subsystem he is connected. The frame synchronization process takes place in accordance with the previously described method, from subsystem to subsystem, starting with the first subsystem 1. During frame synchronization between the first subsystem 1 and the fourth subsystem 4, the system software assigns the master function to one of the two systems, for example the first subsystem 1 is defined as the master system. This immediately ensures frame synchronization for the first, the second and the third subsystem 1, 2, 3, under the control of the first subsystem 1.

The frame synchronization of the first subsystem 1 with the fourth subsystem 4 takes place at the same time, or after the synchronization process of the first, the second and the third subsystem 1, 2, 3. The exchange of signals takes place through a dedicated connection ABC–F, which connects a primary multiplex connection PRAL of the first subsystem 1 with a primary multiplex connection PRA4 of the fourth subsystem 4. According to the method for two subsystems previously described in FIG. 1, the primary multiplex connection PRAL of the first subsystem 1 performs the same functions as the first interface circuit INT1A, which measures the first time difference Δt2, and the primary multiplex connection PRA4 of the fourth subsystem 4 performs the same functions as the second interface circuit INT1B, which measures the second time difference Δt1. The primary multiplex connection PRA1 of the first subsystem 1, under the control of the central control unit CPU of the first subsystem 1, and under the control of the central control unit CPU of the fourth subsystem 4, transmits the first time difference Δt2 to the circuit for delaying the frame synchronization pulses, which are part of the central control CPU of the fourth subsystem 4, and the construction of which is illustrated in FIG. 5. The primary multiplex connection PRA4 of the fourth subsystem 4 also transmits the second time difference Δt1, via the central control CPU of the fourth subsystem 4, to the circuit for delaying the frame synchronization pulses. There, a microcomputer according to unit 6 in FIG. 5 determines the required delay time interval tv and the frame synchronization pulse is delayed.

After the completion of the frame synchronization process of the fourth subsystem 4 with the first subsystem 1, the fifth subsystem 5 can now be synchronized with the fourth subsystem 4. This frame synchronization process takes place in accordance with the method described for FIGS. 1 to 5.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method of synchronizing frames during digital transmission of information from a first subsystem to a second subsystem in a telecommunications system comprising two or more interconnected subsystems which may be remote from each other, characterized by the following steps:

determining, in the first subsystem (1), a second time difference (Δt2) between a frame synchronization pulse (FR1) of the first subsystem (1) and a frame synchronization pulse (FR2) received from the second subsystem (2) and transmitting said second time difference to the second subsystem (2); and determining, in the second subsystem (2), a first time difference (Δt1) between the frame synchronization pulse (FR2) of the second subsystem (2) and the frame synchronization pulse (FR1) received from the first subsystem (1), determining a signal propagation time (ΔT) between the first subsystem (1) and the second subsystem (2) from a sum of the first time difference (Δt1) and the second time difference (Δt2), and subsequently delaying the frame synchronization pulse (FR2) of the second subsystem (2) by a time interval (tv) equal to a difference between the first time difference (Δt1) and the signal propagation time (ΔT).

2. A method as claimed in claim 1, characterized in that in a telecommunications system comprising a plurality of interconnected subsystems, starting from a master subsystem, making a determination of a time interval for delay step by step from subsystem to subsystem.

3. A circuit arrangement for carrying out the method according to claim 1, characterized in that, to determine in said first subsystem the first time difference between the frame synchronization pulse (FR1) of the first subsystem and the frame synchronization pulse (RFR2) received from the second subsystem (2), a received clock signal (CL) is applied to an input of a frame aligner (8) which organizes an association between digital information and the clock signal, that an output (RFR) of the frame aligner (8) at which the received frame synchronization pulse is provided is connected to a first input of a comparator (9), and that a signal line carrying the frame synchronization pulse (FR1) of the first subsystem is connected to a second input of the comparator having an output coupled to a microcomputer (6).

4. A circuit arrangement for carrying out the method according to claim 1, characterized in that, to determine in said second subsystem the second time difference between the frame synchronization pulse (FR2) of the second subsystem and the frame synchronization pulse (RFR1) received from the first subsystem (1), a received clock signal (CL) is applied to an input of a frame aligner (8) which organizes an association between digital information and the clock signal, that an output (RFR) of the frame aligner (8) at which the received frame synchronization pulse is provided, is connected to a first input of a comparator (9), and that a signal line carrying the frame synchronization pulse (FR2) of the second subsystem is connected to a second input of the comparator having an output coupled to a microcomputer (6).

5. The circuit arrangement of claim 4, further characterized in that said microcomputer (6) has an output connected to a delay circuit (13).

6. The circuit arrangement of claim 5, characterized in that said output connected to the delay circuit is indicative of the time interval (tv) by which the frame synchronization pulse (FR2) of the second subsystem is delayed by the delay circuit.

* * * * *